United States Patent
Do et al.

(10) Patent No.: US 8,732,220 B2
(45) Date of Patent: May 20, 2014

(54) VIRTUALIZED FILE SYSTEM

(75) Inventors: Phuc K. Do, Morrisville, NC (US);
Justin M. Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/153,846

(22) Filed: Jun. 15, 2005

(65) Prior Publication Data

US 2006/0288034 A1 Dec. 21, 2006

(51) Int. Cl.
*G06F 17/30* (2006.01)

(52) U.S. Cl.
USPC ............................. 707/831; 707/821

(58) Field of Classification Search
None
See application file for complete search history.

(56) References Cited

U.S. PATENT DOCUMENTS

| | | | |
|---|---|---|---|
| 5,603,019 A * | 2/1997 | Kish | 707/205 |
| 5,706,510 A | 1/1998 | Burgoon | |
| 5,832,522 A * | 11/1998 | Blickenstaff et al. | 707/204 |
| 5,953,522 A | 9/1999 | Fox et al. | |
| 6,026,402 A | 2/2000 | Vossen et al. | |
| 6,098,072 A | 8/2000 | Sluiman et al. | |
| 6,195,650 B1 | 2/2001 | Gaither et al. | |
| 6,339,826 B2 * | 1/2002 | Hayes et al. | 713/166 |
| 6,356,863 B1 | 3/2002 | Sayle | |
| 6,356,915 B1 * | 3/2002 | Chtchetkine et al. | 707/200 |
| 6,363,400 B1 * | 3/2002 | Chtchetkine et al. | 707/200 |
| 6,466,944 B1 | 10/2002 | Stokes | |
| 2002/0065945 A1 | 5/2002 | Calder et al. | |
| 2002/0083118 A1 | 6/2002 | Sim | |
| 2002/0095479 A1 * | 7/2002 | Schmidt | 709/218 |
| 2003/0135514 A1 | 7/2003 | Patel et al. | |
| 2003/0187822 A1 * | 10/2003 | Lefurgy et al. | 707/1 |
| 2004/0093335 A1 | 5/2004 | Sharpe et al. | |
| 2005/0267959 A1 * | 12/2005 | Monga et al. | 709/223 |

FOREIGN PATENT DOCUMENTS

WO    WO03/090074 A2    10/2003
WO    WO2006134023 A1    12/2006

* cited by examiner

*Primary Examiner* — Yuk Ting Choi
(74) *Attorney, Agent, or Firm* — Marcia L. Doubet

(57) ABSTRACT

File system views are created for each application executed by a user, where this user-specific view comprises operating system files needed to run the application and file system changes made with this application for this user. Changes made to the file system during execution are allowed (in accordance with the user's permissions), but by default, those changes are not visible to other applications or to other users. Optionally, a user or administrator may specify that one or more file system views are to be accessible from other views. The view-specific isolation of file system changes applies also to system files and meta-data alterations that might be made to the operating system. In one alternative approach, file system views may be created for an application without regard to individual users, where that application's view is then used for all users who execute the application.

17 Claims, 10 Drawing Sheets

VIRTUALIZED FILE SYSTEM

BACKGROUND OF THE INVENTION

The present invention relates generally to computing devices, and more particularly, to managing file system usage for applications executing on computing devices.

Current file systems offer protection on a per-user basis. That is, user permissions are established for files, such that a program run by a particular user can read, write, delete, and/or execute any file for which that user has the corresponding permissions. This leads to a plethora of security, reliability, and maintenance issues that plague today's computer users.

As examples of security problems, the user's computer is vulnerable to easy infestation by a virus unwittingly executed by the user. Trojan programs may also be unleashed that can read any of a given user's files, and report information from those files without the user's knowledge. So-called "spy ware" might be accidentally installed.

Other file system problems may be caused in less malicious ways, such as through programming errors made by the program developers. For example, a program might overwrite another program's critical files with its own (possibly incompatible) version, which may lead to unpredictable results. Uninstaller programs might be used that fail to completely uninstall a program, leaving behind parts of the application that are no longer usable. And, faulty uninstallers are provided in some cases, making programs difficult to uninstall. When applications that are no longer needed are not uninstalled, system resources may be wasted.

BRIEF SUMMARY OF THE INVENTION

File system views are created for each application executed by a user, where this user-specific view comprises operating system files needed to run the application and file system changes made with this application for this user. Changes made to the file system during execution are allowed (in accordance with the user's permissions), but by default, those changes are not visible to other applications or to other users. Optionally, a user or systems administrator may explicitly specify that particular applications have access to other views, where this access may comprise read-only access, copy-on-write access, and so forth. The access to other views may be allowed among applications executed by the same user, and/or may comprise allowing one or more of this user's file system views to be accessed by applications executed by one or more other users.

In one alternative approach, file system views may be created for an application without regard to individual users, where that application's view is then used for all users who execute the application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will become apparent in the non-limiting detailed description set forth below.

The present invention will be described with reference to the following drawings, in which like reference numbers denote the same element throughout.

DETAILED DESCRIPTION OF THE MENTION

Figure 1:
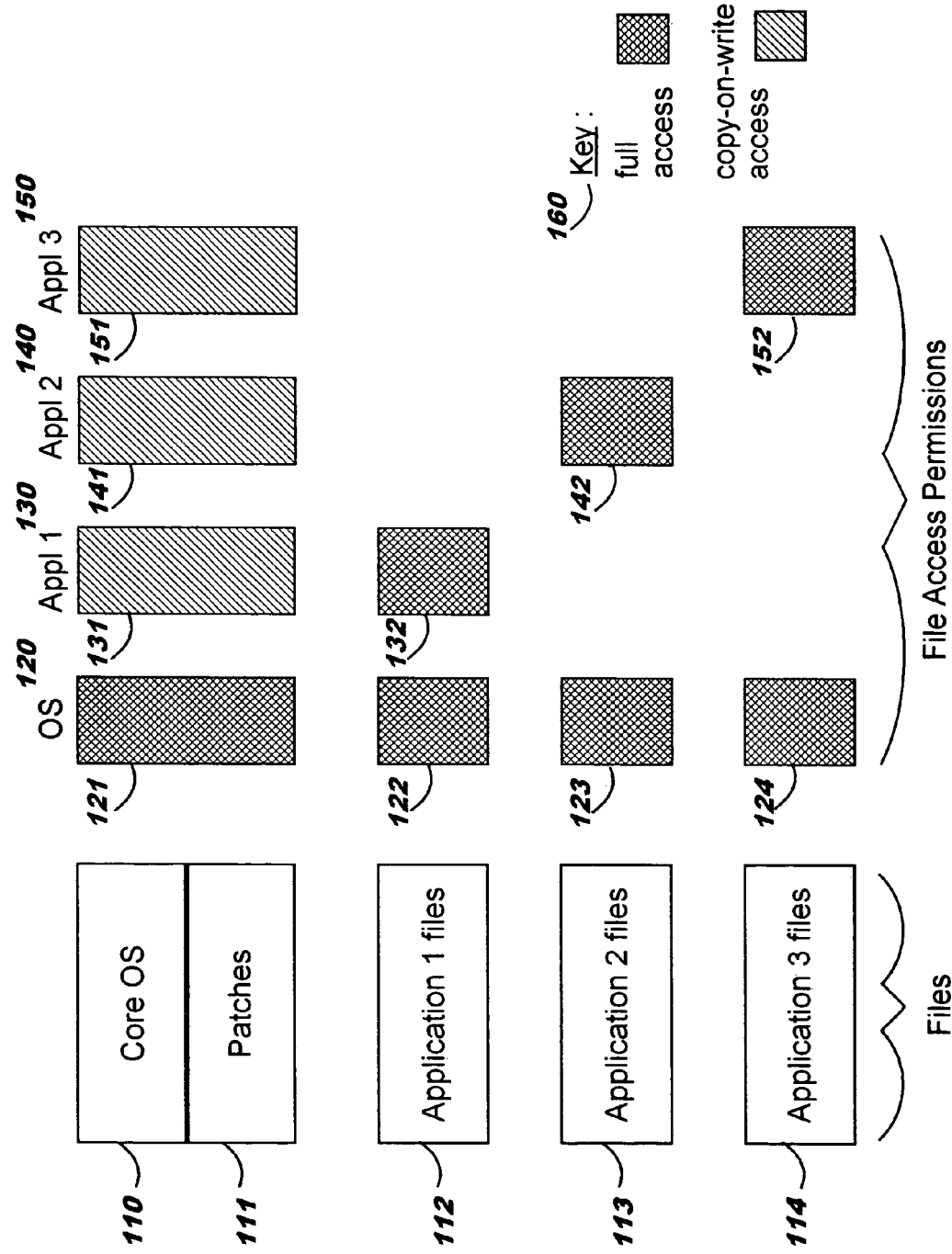
FIGS. 1 and 2 illustrate sample file system usage scenarios.

Embodiments of the present invention bring the advantages of virtual memory into the realm of file systems. By way of review, virtual memory allows multiple applications to execute without the knowledge of other executing applications, while the collection of executing applications shares the same physical memory in a well-controlled manner. Virtual memory usage provides security and reliability that was impossible when using prior shared memory space techniques. The term "virtualized file system" is used herein to refer to multiple applications sharing a file system, each application having its own view of one or more files from the file system.

In one or more embodiments of the present invention, each application is treated as a separate entity, per user, for every user that executes the application. When an application is initially executed by a particular user, the application is given a "fresh" view of the base file system (where this view of the "base" file system preferably includes the operating system files required for executing the application). As the application is executed on behalf of the user, any changes made to the file system are allowed (in accordance with the user's permissions), but by default, those changes are not visible to other applications or to other users. Upon subsequent execution of this application by the same user, this user-specific view shows only those file system changes that were made with this application for this user: by default, changes made by other users, and by this user when executing other applications, are not visible. Notably, this isolation of the user's changes applies also to system files and meta-data alterations that might be made to the operating system, such as changes made to the registry when using a Microsoft Windows® operating system. ("Windows" is a registered trademark of Microsoft Corporation in the United States, other countries, or both.)

Preferably, one or more embodiments of the present invention enable a user to allow access to the user's view of the file system, created with regard to a particular application, by other applications. Each such other application accessing the file system view can be given different permissions to use the files in the view, if desired. The user may also grant permissions to other users to access a file system view. In any case, per-user security is still maintained. (For example, the user may allow access to a particular one of his or her views, granting read-only access to another user or perhaps by granting copy-on-write permission. However, the integrity of the user's files will be maintained: there is no risk of the other user altering the files within the original user's view.)

Because applications in these embodiments cannot access data of other applications unless explicitly allowed by a user, techniques disclosed herein prevent Trojan programs from accessing the user's files without explicit permission of the user, even if the Trojan program is unwittingly executed by the user. Instead, the Trojan program's file system changes will be isolated within a view created for the Trojan program. The changes can be removed from the system by removing this view. Similarly, a virus cannot infect the user's base operating system, nor can it affect or infect other applications, since any changes made by the virus to the file system as the virus executes will be limited to its own unique view (and will therefore be confined to copies of files that are used by the run-time environment in which the virus executed).

Techniques disclosed herein enable an installed application to be portable among systems that use the same operating system: by transferring the application's file system view (for example, by transferring a package comprising a collection of the system files and data files used/created by the application) from a first system to a second system, the second system is able to execute the application as if it was still executing on the first system, and equally, as if the previous executions of the application had taken place on the second system. (In the prior art, transferring an installed application from a first system to a second system would normally require knowledge of each individual file used by the application on the first system, such that the proper set of files could then be located and transferred to the second system.)

An application can be completely uninstalled, using techniques disclosed herein, by removing its file system view; and, if multiple users have views of the application, an administrator may delete all the views. That is, all changes made by an application can be deleted by removing the view(s) containing the record of those changes. In addition, a user can determine which files have been changed by an application by examining the application's file system view.

Applications that use different versions of a library (e.g., a "dll" or "so" file) can each install their respective library versions without conflicting with the other, using techniques disclosed herein. This may increase application reliability and ease of development. An errant program cannot corrupt a user's files, except those that it creates or modifies, thereby limiting the scope of the corruption. Critical operating system files will always be intact for instant recovery: that is, such files cannot, in general, be altered. (If one application deletes the operating system kernel, for example, the deletion applies only to that particular application's file system view: the kernel remains available to other applications.)

Figure 2:
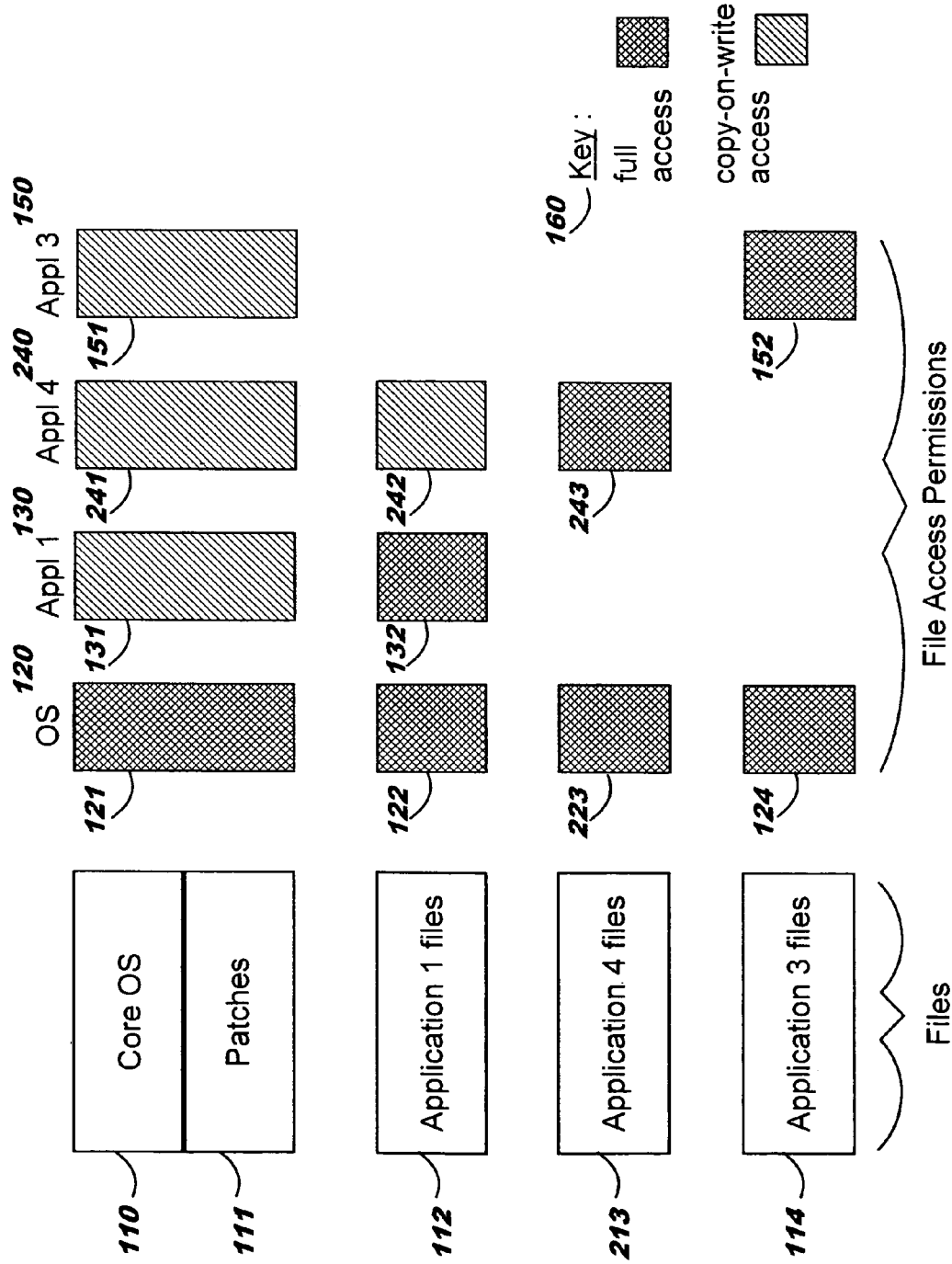

FIGS. 1-2 illustrate sample file system usage scenarios. (In each case, the scenarios are depicted from a single user's perspective.) Referring first to FIG. 1, suppose 3 applications are executing in a system under control of a particular operating system ("OS"), where the applications are referred to as "Application 1", "Application 2", and "Application 3". The files in the system typically include a number of core operating system files, illustrated in FIG. 1 at reference number 110. A number of patches to the operating system may also be present. These files are represented at reference number 111. The file access permissions of the operating system are shown in column 120. As indicated in FIG. 1 by the graphic at reference number 121, the operating system itself has full access to the core OS files and patches. (See key 160, where the graphics used in FIGS. 1 and 2 are described. It should also be noted that while FIGS. 1 and 2 illustrate use of 2 permissions, other permissions may be specified, beyond those shown at 160, such as read-only or shared file access.) A file system view may be created for the core operating system files 110 and the patches 111; or, separate file system views may be created for 110 and 111, if desired.

In this first scenario, reference numbers 112, 113, and 114 of FIG. 1 indicate that each of the 3 applications uses some set of files. According to one or more embodiments, each application executed by a user will create a separate view for its files, as noted above. Thus, individual file system views are preferably created for each of 112, 113; and 114 (where each view also preferably includes the operating system files/patches used by the respective application). For this scenario, assume that the sets of files 112-114 are non-overlapping (i.e., the applications have no files in common, other than their usage of the core OS files 110 and patches 111). Suppose, by way of illustration, that Application 1 is a human resources application used for a corporation's employees, Application 2 is an accounts payable application used for paying the corporation's suppliers, and Application 3 is an online shopping application. Presumably, the operating system is given full access to the files used by each application (including any files newly-created by the applications). Thus, the graphic at reference number 122 indicates that OS 120 has full access to the files in Application 1's file system view, and similarly, the graphics at reference numbers 123 and 124 indicate that OS 120 has full access to the files in the file system views for Application 2 and Application 3, respectively.

The file access permissions of Application 1 are shown in column 130. For this scenario, Application 1 has copy-on-write permission to the operating system's core files 110 and patches 111. See the graphic at 131. Application 1 has full access to its own files; see the graphic at 132. "Copy-on-write" access, or "COW", as that term is used herein, refers to using a base version of a file until determining that an update is required, and then making a copy of the file and applying the update to the copy. The copy will be reflected in the application's file system view, as updated. By default, such changes are not then viewable outside the view.

The file access permissions of Applications 2 and 3 are shown in columns 140 and 150, respectively. For the scenario of FIG. 1, Applications 2 and 3 both have copy-on-write permission to the operating system's core files and patches. See the graphics at 141 and 151. Both Application 2 and Application 3 have full access to their own files; see the graphics at 142 and 152. However, in this scenario, none of the applications access files from the other applications' file system views.

Referring now to FIG. 2, a second file system usage scenario is illustrated. As in FIG. 1, the operating system 120 has full access to the core OS files and patches 110, 111, as shown at 121 of FIG. 2. The operating system also has full access to the files of the applications (i.e., to the file system views created for the applications), which in this case are represented by reference numbers 112, 213, and 114; see the graphics at reference numbers 122, 223, and 124 of FIG. 2.

Suppose that Application 1 and Application 3 in this second scenario are the same applications discussed above, namely a human resources application used for a corporation's employees and an online shopping application. However, suppose that an application named "Application 4" replaces Application 2, where Application 4 is an e-mail application usable by the corporation's employees. Further suppose that Application 1 is responsible for maintaining a current list of the corporation's employees, and that this list is consulted by Application 4 (e.g., to ensure that only authorized employees can access the corporation's e-mail resources). In this second scenario, therefore, the files used by Applications 1 and 4 have an overlap. For this scenario, FIG. 2 shows that Application 4 has copy-on-write access to the file system view(s) for core operating system files 110 and patches 111 (see reference number 241), while having full access to a file system view comprising its own files 213 (see reference number 243) as well as copy-on-write access to (at least some of) the files of Application 1 (see reference number 242). Preferably, Application 4 will make a copy of applicable ones of the files from the file system view created for Application 1's files, store that copy in the local file system view for Application 4, and make any updates to that local copy. Notably, any changes that Application 4 makes to its local copy are not viewable to Application 1 (unless the user or administrator explicitly allows such access).

Applications executing under control of an operating system that uses the virtualized file system disclosed herein may be considered as having their own separate run-time environments. An application's file system view may be considered a "stacked" view that generally comprises the file system view the application was installed "on top of", plus any file system alterations made by the application. From this perspective, file system views for other applications may be stacked "underneath" a particular application's file system view. This stacking is illustrated using FIG. 3, as will now be described.

Figure 3:
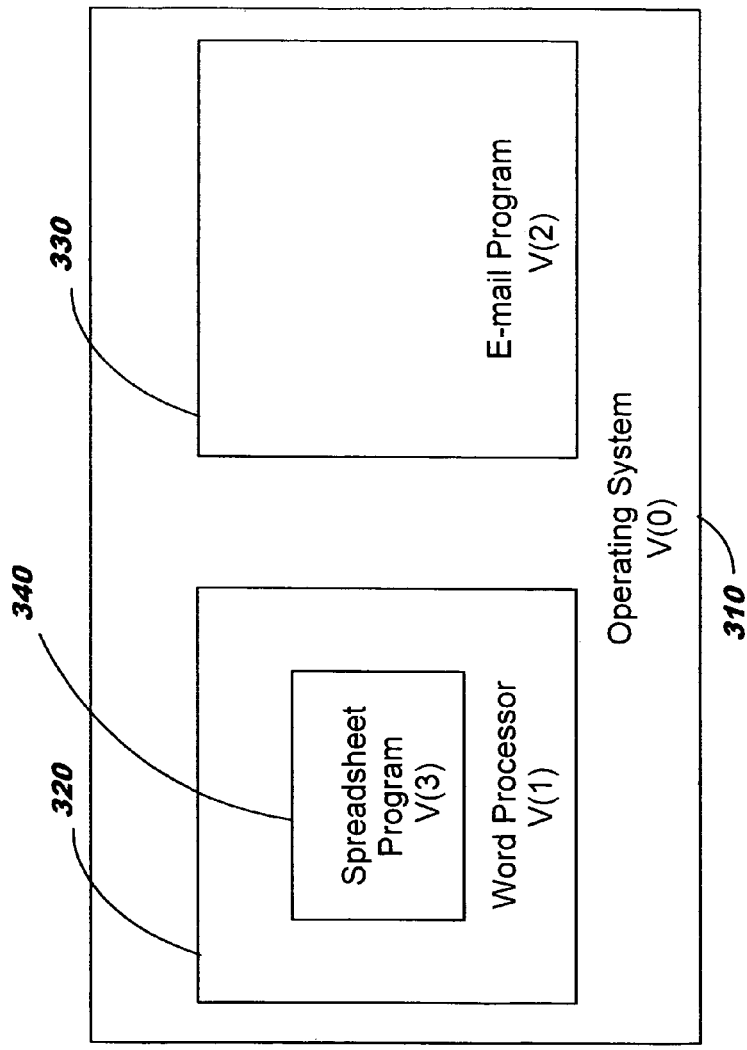
FIG. 3 illustrates stacking of application file system views.

In the example of FIG. 3, a base operating system is installed, and creates a view "V(0)". See reference number 310 of FIG. 3. A word processor is also installed, and is executing under control of that operating system. The word processor may therefore be considered as installed on top of the operating system, and therefore the word processor's file system view is "on top of" the operating system's file system view. In FIG. 3, the word processor's file system view is referred to as "V(1)", shown at 320. An e-mail program is also installed on top of the operating system and therefore its file system view is stacked on top of the operating system's file system view. The e-mail program's file system view is shown as "V(2)"; see reference number 330. Suppose a spreadsheet program is to be executed, and is installed on top of the word processor. FIG. 3 shows the spreadsheet program's file system view, "V(3)", as being stacked on top of the file system view V(1) of the word processor. See reference number 340. (This stacking may be done, for example, by a user or administrator after installation of one or more applications.)

In this example, the spreadsheet program can access (using appropriate permissions) all files installed or created by the word processor, but not vice versa, because the word processor's file system view V(1) is part of the underlying stack of the spreadsheet program's file system view V(3). And, all of the applications can access files installed by the operating system in its underlying file system view V(0). If files of the operating system need to be patched, for example to address security vulnerabilities, the patches can be made to file system view V(0)—assuming appropriate authentication is established for updating those files—and (assuming explicit user/administrator permission for accessing the view) all applications installed on top of view V(0) will then benefit from the security patches. Similarly, if the word processor makes changes in its file system view V(1), such as by creating a new document, the spreadsheet program can then see those changes through its stacked file system view V(3). (While this example illustrates file access among several of the views, it should not be construed as limiting. Permissions between views may be established in ways other than those discussed with reference to the stacked views in FIG. 3. For example, a user or administrator might specify that a word processor and e-mail application both be given full access permissions to files in the other's view.)

Files in the present invention's virtualized file system can be created, overwritten, altered, etc. However, according to one or more embodiments, all changes are captured by a file system processing layer; this layer then associates the changes with the user and the application making the change. The association is recorded in a persistent store such as a relational database. The collection of data to be stored is referred to herein as "metadata". For subsequent executions of a particular application by the user, the changes made to the file system during previous executions will be visible, but in general (e.g., without explicit access permission to the file system view), other applications will not see those changes. Instead, the other applications will see their own view of the files in the file system.

If two applications executed by a user need to interoperate and thereby access the other's files, their file system views can be merged, such that all changes made by one application are seen by the other application. Or, permissions can be granted to allow one application to access files of another application's file system view. For example, the e-mail program in FIG. 3 may be given read-only permission to the word processor's file system view V(1). This enables documents generated by the word processor to be e-mailed using the e-mail application, for example.

Figure 4:
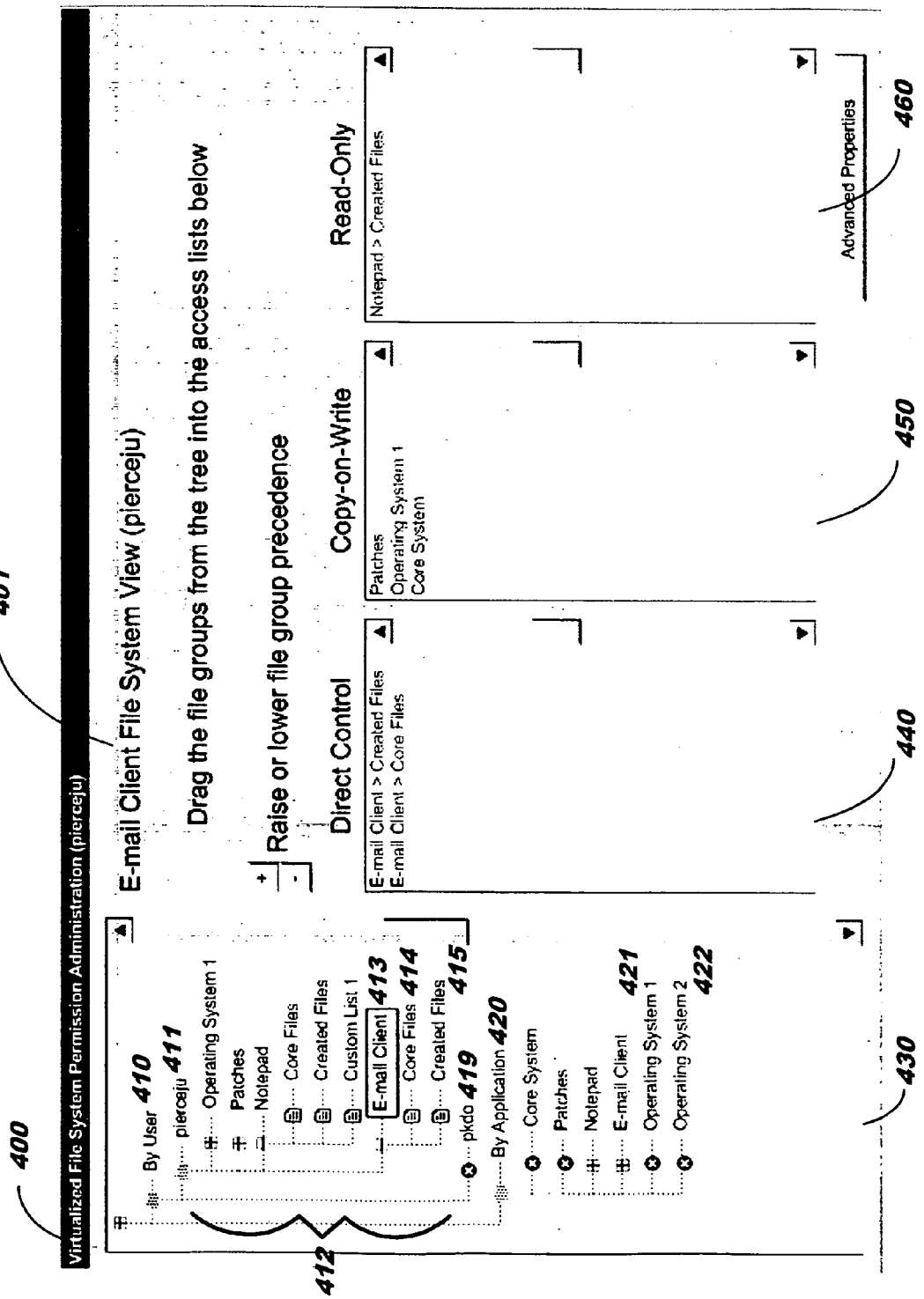
FIG. 4 shows a sample graphical user interface ("GUI") display with which permissions to access file system views may be granted.

FIG. 4 shows a sample GUI display 400 with which permissions to access file system views may be granted. This GUI illustrates availability of user-specific views for 2 users (see reference number 410, stating "By User"); see reference numbers 411 and 419, where the users are identified as "pierceju" and "pkdo".

FIG. 4 also illustrates an alternative approach that may be supported by one or more embodiments of the present invention, where file system views are not only provided per user, per application (as has been discussed): in this alternative approach, file system views may also be established per application, without regard to which user is executing the application. This latter approach is shown at reference number 420, referring to the file system views that have been created "By Application". This alternative approach may be particularly beneficial where all users should share the same version of the files in a particular file system view. An embodiment that allows views per user, per application as well as views per application may, for example, provide a configuration interface through which a choice of these approaches can be made.

Referring again to the per-user, per-application file system views, the view for user "pierceju" 411 is expanded, in this illustration. See, generally, reference number 412. As shown therein, this user has application file system views named "Operating System 1", "Patches", "Notepad", and "E-mail Client", and in this example, each of these views can be further expanded to show logical components of the views that are available. The E-mail Client view at 413, for example, has been expanded to show 2 components "Core Files" 414 and "Created Files" 415. This illustrates an optional enhancement, whereby one or more embodiments may use separate file system permissions for the files they originally install (e.g., Core Files component 414) and for the files they create after installation (e.g., Created Files component 415).

Graphical highlighting is provided around the text "E-mail Client" at 413 to indicate that this application's file system view has been selected (e.g., using a mouse pointer). See also 401, where the selected application's name is presented in the descriptive information for window 400. The panes 440, 450, and 460 show the file system access permissions within the views created for user 411's execution of the E-mail Client application. As shown in pane 440, in this example, direct control (full access) is provided over files in the "Created Files" and "Core Files" components of the E-mail Client application view. Thus, the E-mail Client application can perform operations including read, write, delete, and so forth on those files. Pane 450 shows that copy-on-write access has been specified for files in the "Patches", "Operating System 1", and "Core System" views. Pane 460 shows that read-only access has been specified for files in the "Created Files" component of the "Notepad" application view.

The user (or perhaps an administrator) may specify file access permissions through a GUI such as that shown in FIG. 4, for example by dragging and dropping graphic representations of file system components from pane 430 to panes 440-460 or by dragging and dropping graphic representations among the panes 440-460.

Figure 5:
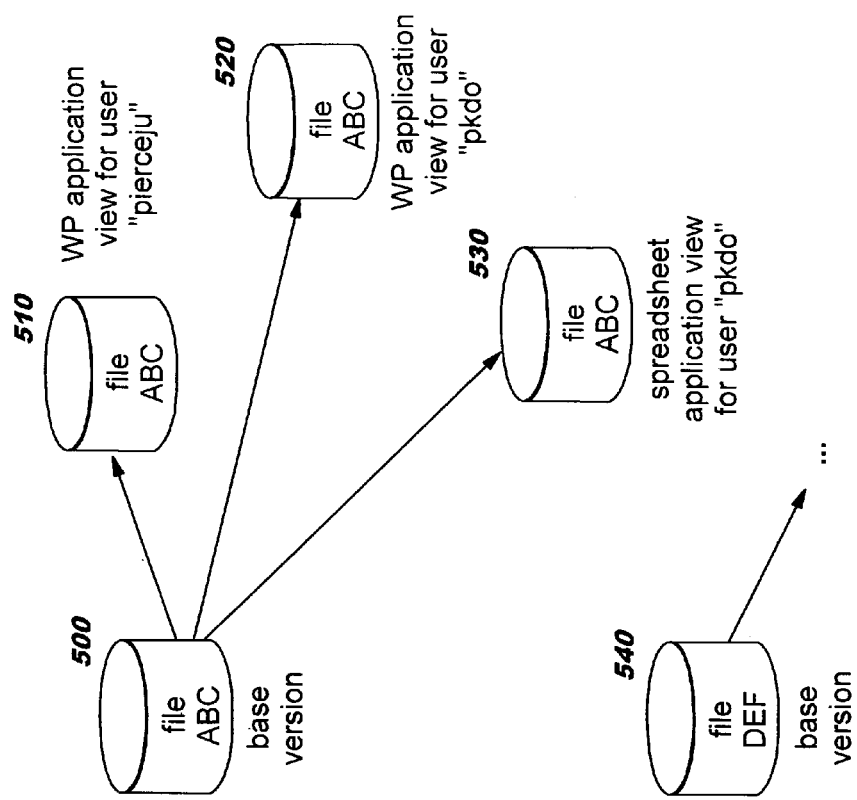
FIG. 5 illustrates using file copies in per-user, application-specific file system views.

FIG. 5 provides an illustration of using file copies in file system views, where a base version exists for each of a first file "ABC" 500 and a second file "DEF" 540. Copies of file ABC have been made for 3 different file system views, in this example. A user "pierceju" has a copy 510 in a view for a word processor ("WP") application. A user "pkdo" has a first copy 520 in a view for the word processor and a second copy 530 in a view for a spreadsheet application. As has been stated, any changes made to these copies 510-530 are not viewable among users or among applications, unless an administrator or the user for whom the copy was made grants permission for accessing the view containing that copy. Copies may be made of file DEF 540 in one or more application views as well, although this has not been illustrated. For example, the view that includes the copy 510 might also include a copy of file DEF, such that the word processor executed by user "pierceju" can make updates to file DEF.

Figure 6:
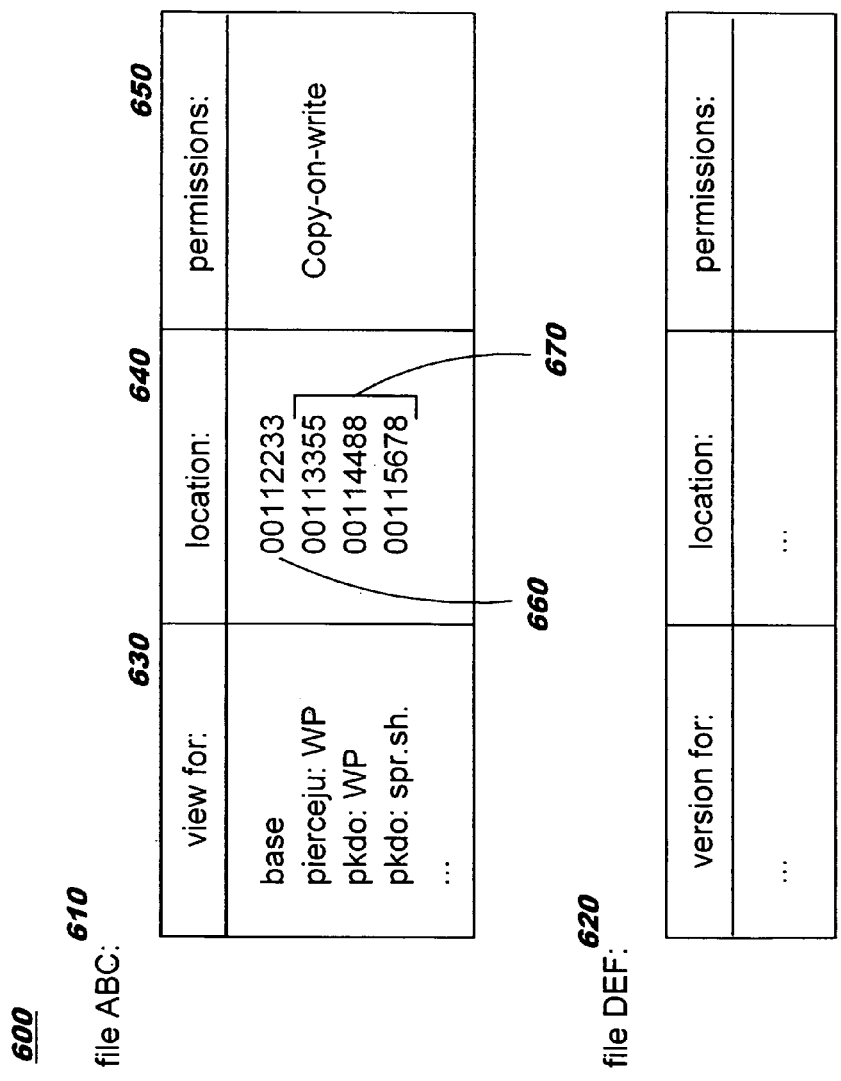
FIG. 6 illustrates one manner in which metadata might be structured for storing information about the file copies from FIG. 5 and their usage in various file system views.

FIG. 6 provides one example to illustrate how metadata might be structured for storing information about the file copies from FIG. 5 and their usage in various file system views. A tabular form is shown in FIG. 6, although other data structures may be used. Metadata 600 in this example comprises entries for each file 610, 620, and for each file, provides an identification 630 of the "owner" of a particular view of the file (e.g., specifying that this is the base version, or identifying the user and application on whose behalf a copy was created); the location 640 of the copy used in that view; and, as applicable, access permissions 650 for the view. For example, an entry 660 is provided for the base version of file ABC (illustrated at reference number 500 in FIG. 5), specifying that the base version is located at address "00112233". (Alternatively, a separate data structure might be used for specifying the location of each base version, such that the data structures illustrated in FIG. 6 then contain only view-specific information.) Other entries, shown generally at 670, indicate where the copies of file ABC are located for the views discussed above with reference to FIG. 5. (While preferred embodiments are discussed herein as making a copy of "a file", this should not be construed as limiting. It may be desirable to copy an entire file, or to copy portions thereof. Changes might be represented using blocks or sectors that are associated with; but stored separately from, the file itself.) Permissions column 650 indicates, in this example, that copy-on-write permission applies to the view created for user "pierceju" when using the application "WP".

Other information may be provided in metadata 600 without deviating from the scope of the present invention, although this has not been illustrated. In addition, an alternative organization may be used for the metadata. For example, instead of organizing the metadata by file, as shown in FIG. 6, one alternative approach that may be used is to organize the metadata by application within user, such that all file copies that have been created for a particular user are stored together, grouped according to the application for which the copies were created.

According to one or more embodiments, an operating system application programming interface ("API") is provided through which file access requests are made, and calls to routines of this API invoke operations of a file system layer that provides the virtualized file system disclosed herein. In response to the API calls, metadata for the calling application and user is consulted and the invocation is processed accordingly (as will be discussed in more detail with reference to FIGS. 7-9). Preferably, use of the virtualized file system is transparent to the application developer, who simply codes the application to invoke the API without regard to how the underlying file system is implemented. Alternatively, however, it may be desirable in some scenarios to write applications that are aware of the virtualized file system. Such an application might, for example, include a code to ask the user whether the user wishes this application's file system view to be accessible to other selected applications (such as a set of applications created by a common vendor).

Figure 7:
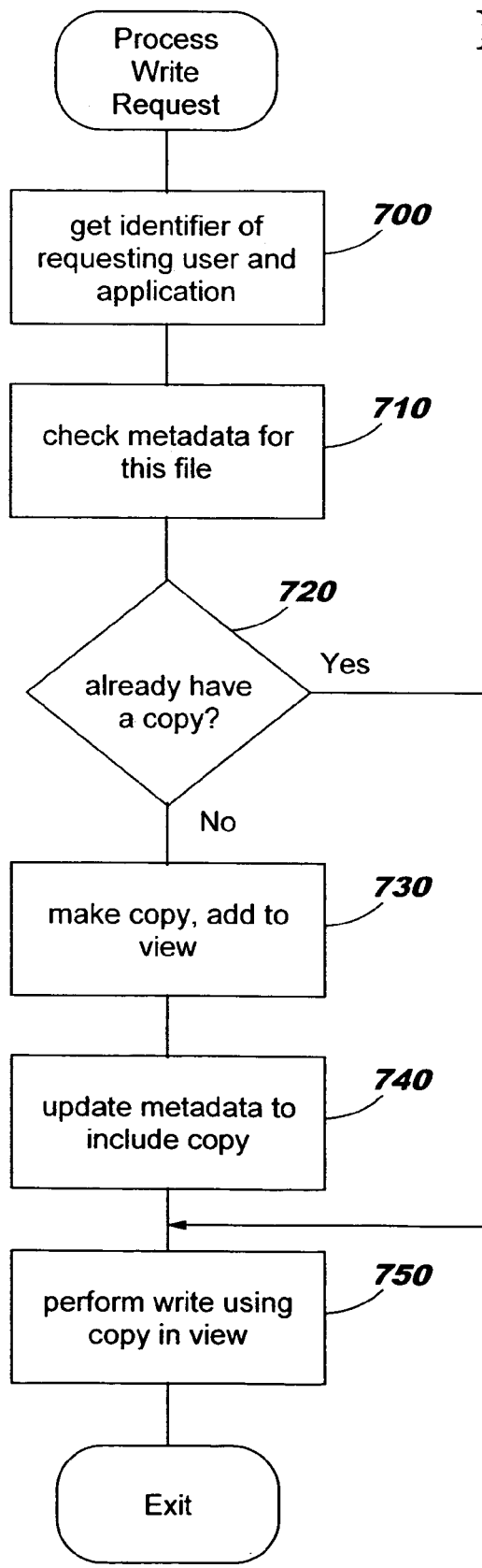
FIGS. 7-9 provide flowcharts depicting logic which may be used when implementing one or more embodiments of the present invention.
Figure 8:
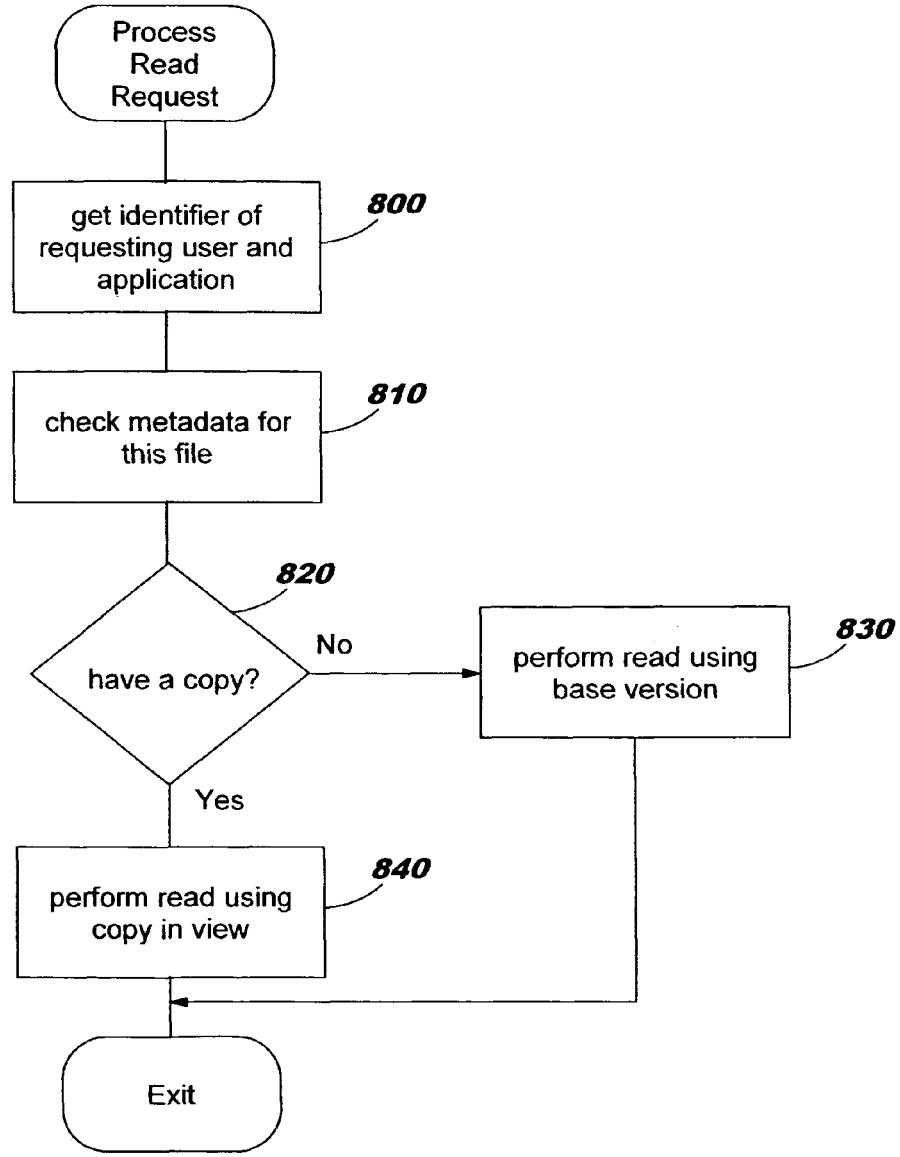
Figure 9:
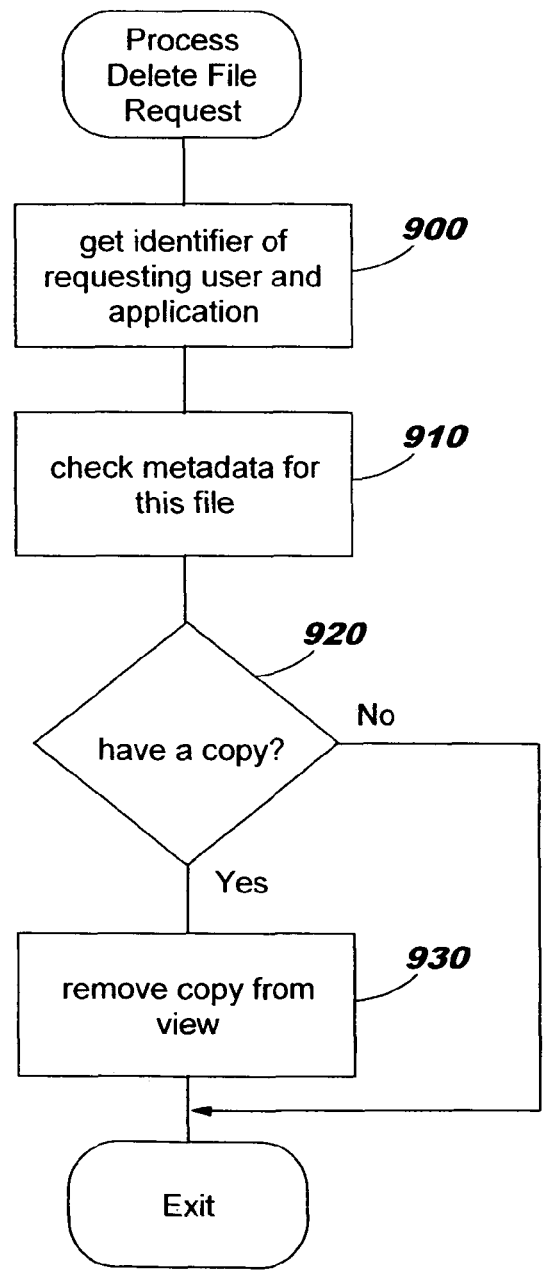

Referring now to FIGS. 7-9, flowcharts are provided that depict logic which may be used when implementing embodiments of the present invention. Each of these figures will now be discussed.

Referring first to FIG. 7, when a write request is received for a particular file, the requesting user and application are determined (Block 700). The metadata for this file is consulted (Block 710) to determine whether a copy has been created in a view corresponding to the requesting user and application. (As discussed above, rather than organizing the metadata by file, as shown in FIG. 6, alternative organizations may be used. It will be obvious that Block 710, as well as corresponding logic of the remaining flowcharts, may be adapted to other approaches for the metadata organization. For example, rather than accessing a relational database using the file name as a key, according to the structure illustrated in FIG. 6, a key might alternatively be comprised of an identifier of the requesting user and application.)

The test at Block 720 checks to see if a copy of this file already exists for the requesting user and application, according to the metadata. If not, then processing continues at Block 730, where a copy of the file is made and added to the file system view that corresponds to this user executing this application. The copy may be made from the base version of the file, the location of which may be determined (for example) from the metadata. Alternatively, when file system views are stacked (as discussed with reference to FIG. 3), the copy may be made from the top-most view that both underlies the current view and contains a view of this particular file. Block 740 then updates the metadata to include an entry for this newly-created copy.

Control reaches Block 750 when the test in Block 720 has a positive result (i.e., a copy of the file already exists in the view for this user executing this application), and following execution of Block 740. At Block 750, the write request is performed using the copy in the view for the requesting user and application. Processing then exits from FIG. 7.

FIG. 7 has not illustrated details of copy-on-write processing. It will be obvious to one of skill in the art how the illustrated logic can be adapted, for example to delay making the copy at Block 730 until determining that the write request will, in fact, be made to cause an alteration to the data in the file. (Furthermore, embodiments of the present invention may use write processing that does not include a copy-on-write optimization.) Furthermore, FIG. 7 has not illustrated details of permission checking, e.g., to determine whether the write request is being attempted for a file having read-only permission. It will be obvious, once the teachings of the present invention are known, how the logic depicted in FIG. 7 (as well as in FIGS. 8 and 9) can be augmented for such checking.

FIG. 8 illustrates processing for a read request that is received for a particular file. The requesting user and application are determined (Block 800). The metadata for this file is consulted (Block 810) to determine whether a copy has been created in a file system view corresponding to the requesting user and application.

The test at Block 820 checks to see if a copy of this file already exists for the requesting user and application, according to the metadata. If not, then processing continues at Block 830, where the read request is carried out using the base version of the file. (When views are stacked, as discussed with reference to FIG. 3, a "precedence" approach may be used where the read request reads a file copy from the top-most view that both underlies the current view and contains a view of this particular file, rather than using the base version.) Otherwise, when the test at Block 820 has a positive result, then the read is carried out at Block 840 using the copy of the file from the current file system view (that is, the file system view for the requesting user and application). Processing then exits from FIG. 8.

FIG. 9 illustrates processing for a delete file request that is received for a particular file. The requesting user and application are determined (Block 900). The metadata for this file is consulted (Block 910) to determine whether a copy has been created in a file system view corresponding to the requesting user and application.

The test at Block 920 checks to see if a copy of this file exists in the current view for the requesting user and application, according to the metadata. If not, then the delete file operation will not be performed, and processing exits from FIG. 9. (A message may be generated, if desired, indicating that the request will not be carried out.) Otherwise, Block 930 removes the copy of the file from the current file system view. Processing then exits from FIG. 9.

Processing requests to delete an individual data item from a file may be implemented in a manner similar to the write operation illustrated in FIG. 8. That is, if a copy of the file does not yet exist in the file system view for the requesting user and application, then a copy is made for that view, and the deletion of data is then carried out using that file copy. Otherwise, the deletion is made to the copy that already exists in the file system view. (If the current view does not have a copy of the file, but a copy exists in an underlying, stacked view, then the stacked copy is preferably used when creating the copy for the current view.)

Requests to open and close files may be handled using logic similar to that of FIG. 8, substituting "open" or "close" for "read", respectively (and separate flowcharts illustrating these details are not deemed necessary to a full understanding of the present invention). In particular, the metadata is preferably checked to determine whether a copy exists in the current file system view. If not, then the base version (or an underlying stacked copy, as applicable) is preferably opened or closed, depending upon the requested action; otherwise, the copy in the current file system view is opened or closed.

When using an approach that establishes file system views per application, without regard to which user executes the application, the logic shown in FIGS. 7-9 can be adapted accordingly. For example, Block 700 can be adapted to obtain the identifier of the requesting application, and Block 710 can be adapted to check the metadata associated with this application. Preferably, separate API calls are provided for this approach, and logic adapted from the examples shown in FIGS. 7-9 is used for supporting these separate API calls.

Using techniques disclosed herein, users are given significant control over the applications they employ. All changes made to a file system by a particular user can be removed by removing the file system views created by that user. Similarly, all changes made by any user of a particular application can be removed by removing each of the file system views created for the application. Or, all changes made by a single user executing a particular application can be removed by removing the file system view created for that user and that application. To control application access among users, preferred embodiments grant or deny access to particular file system views. Similarly, to control interaction among applications, permissions are preferably specified with regard to file system views used by the applications. (In the prior art, users may be unable to determine which applications are using which files, and thus how the applications are interacting.) And when file content in one or more views has been damaged, other portions of the computer system can continue to function, without infection by the damaged view(s), thus providing a type of guaranteed system availability.

One or more embodiments of the present invention may be provided that support installation of more than one operating system on a particular computing system, including installation of heterogeneous operating systems on a single computing system. Each operating system is preferably provided with its own file system view, using techniques disclosed herein. (See, for example, reference numbers 421 and 422 of FIG. 4, where views for "Operating System 1" and "Operating System 2", respectively, are represented in the GUI 400.) A user may then be allowed to select execution under a particular one of the installed operating systems. Because each operating system's files are stored in separate file system views, collisions and incompatibilities among them are avoided. Permission to access files in other views may be enabled among the file system views of the operating systems, if desired (e.g., by specifying permissions using GUI 400).

As will be appreciated by one of skill in the art, selected components of the present invention may be provided as methods, systems, and/or computer program products comprising computer-readable program code. Accordingly, the present invention may take the form of an entirely hardware/firmware embodiment. An embodiment combining software and hardware/firmware aspects might be used alternatively. Or, components of the present invention may be provided in a software embodiment.

Furthermore, components of the invention may take the form of a computer program product accessible from computer-usable or computer-readable media providing program code for use by, or in connection with, a computer or any instruction execution system. For purposes of this description, a computer-usable or computer-readable medium can be any apparatus that can contain, store, communicate, propagate, or transport a program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, removable computer diskette, random access memory ("RAM"), read-only memory ("ROM"), rigid magnetic disk, and optical disk. Current example of optical disks include compact disk with read-only memory ("CD-ROM"), compact disk with read/write ("CD-R/W"), and DVD.

Figure 10:
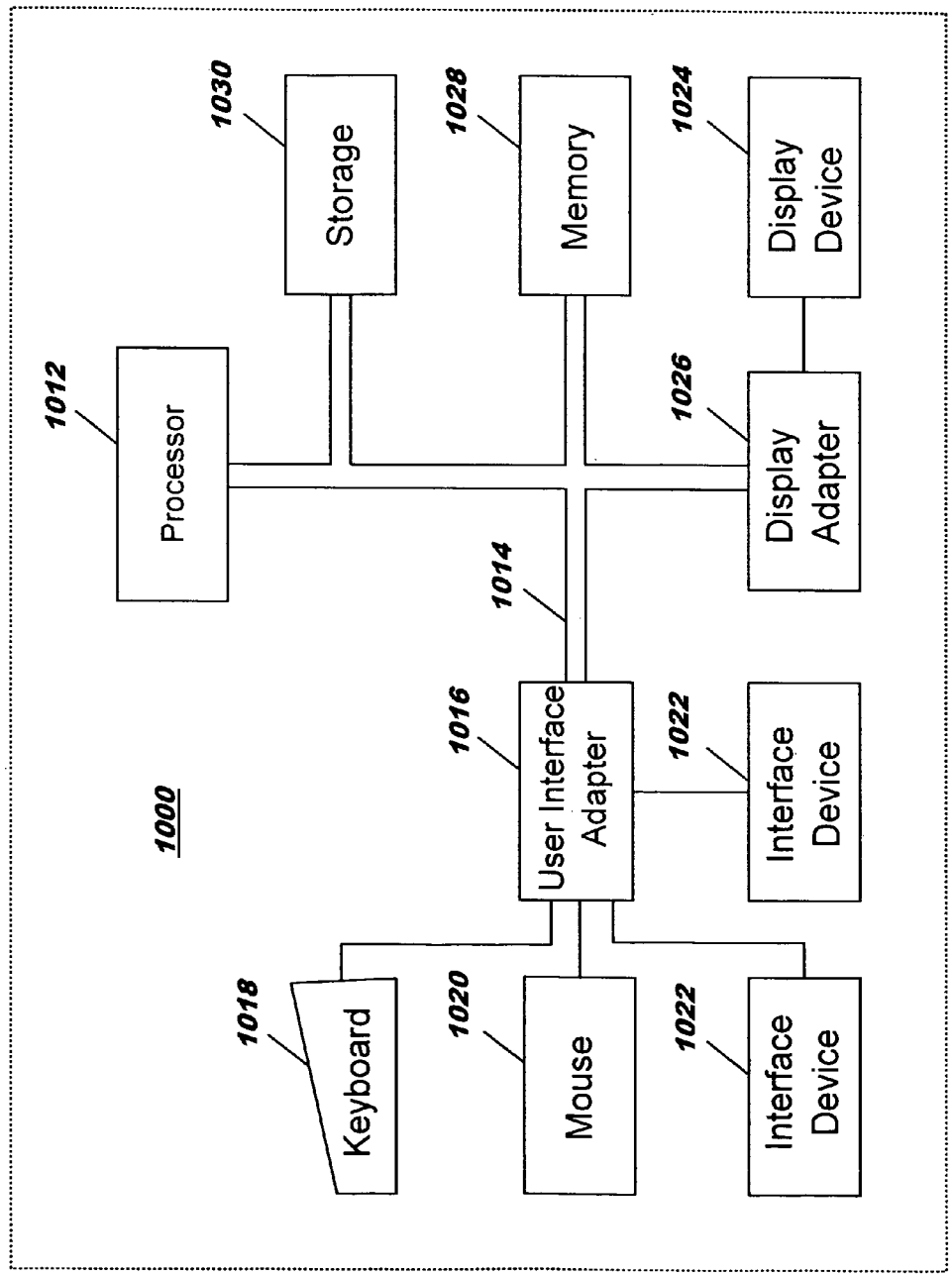
FIG. 10 depicts a data processing system suitable for storing and/or executing program code.

Referring now to FIG. 10, a data processing system 1000 suitable for storing and/or executing program code includes at least one processor 1012 coupled directly or indirectly to memory elements through a system bus 1014. The memory elements can include local memory 1028 employed during actual execution of the program code, bulk storage 1030, and cache memories (not shown) which provide temporary storage of at least some program code in order to reduce the number of times code must be retrieved from bulk storage during execution.

Input/output (I/O") devices (including but not limited to keyboards 1018, displays 1024, pointing devices 1020, other interface devices 1022, etc.) can be coupled to the system either directly or through intervening I/O controllers or adapters (1016, 1026).

Optionally, network adapters (not shown in FIG. 10) may be coupled to the system to enable the data processing system to become coupled to other data processing systems or remote printers or storage devices through intervening private or public networks. Modems, cable modem attachments, wireless adapters, and Ethernet cards are just a few of the currently-available types of network adapters.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

The invention claimed is:

1. A computer-implemented method of controlling access to all files of a file system, comprising using a processor of a computer to perform:
   responsive to invocation of each of a plurality of applications for execution by any particular one of a plurality of users of a file system, automatically creating, by a file system access layer that controls all access to all files of the file system, a user-specific and application-specific file system view for each of the invoked applications;
   automatically adding to the file system view, by the file system access layer, a copy of all files created by or changed by each of the invoked applications as the each application executes on behalf of the particular user, wherein for each of the invoked applications:
      all changes made by the invoked application to each added file, as the invoked application executes on behalf of the particular user, are made only to the copy added to the file system view;
      the automatically creating and the automatically adding are configured to prohibit the user from adding files to, or removing files from, the file system view for the invoked application; and
      the automatically creating and the automatically adding thereby isolate the files in the file system view created for the invoked application as the invoked application executes on behalf of the particular user from access by any of the other users and from access by any other application executed by the particular user; and
   upon completion of each of the executed applications invoked by the particular user, persisting the created file system view created therefor, such that the automatically-added copy of each of the changed or created files is available for a next execution of the completed application by the particular user through use of the persisted file system view.

2. The computer-implemented method according to claim 1, wherein the user-specific and application-specific file system view comprises a plurality of files.

3. The computer-implemented method according to claim 2, wherein at least one of the files in the user-specific and application-specific file system view for each of the invoked applications is an operating system file for an operating system under control of which the invoked application executes.

4. The computer-implemented method according to claim 1, wherein:
   the file system access layer comprises a plurality of invocable application programming interface routines, each of which provides a different type of file access; and
   each of the invoked applications invokes ones of the routines, according to a desired type of file access, to access files needed by the invoked application as the invoked application executes.

5. The computer-implemented method according to claim 4, further comprising:
   receiving, by the file system access layer, a request by the invoked application to read data from a particular file;
   reading the data from a copy of the particular file in the file system view created for the invoked application and user from which the request is received, if the copy is available in the file system view; and
   reading the data from a base version of the particular file, otherwise.

6. The computer-implemented method according to claim 4, further comprising:
   receiving, by the file system access layer, a request by the invoked application to write data to a particular file;
   writing the data to a copy of the particular file in the file system view created for the invoked application and user from which the request is received, if the copy is available in the file system view; and
   storing, in the file system view, a copy of the particular file made from a base version thereof, and writing the data to the stored copy, otherwise.

7. The computer-implemented method according to claim 4, further comprising:
   receiving, by the file system access layer, a request by the invoked application to delete a particular file; and
   deleting a copy of the file from the file system view created for the invoked application and user from which the request is received, if the copy is available in the file system view, and otherwise not performing the requested deletion.

8. The computer-implemented method according to claim 1, further comprising enabling the particular user to grant non-update permission for accessing the file system view created for each of the invoked applications to one or more other applications.

9. The computer-implemented method according to claim 1, further comprising enabling the particular user to grant non-update permission for accessing the file system view created for each of the invoked applications to one or more other users.

10. The computer-implemented method according to claim 9, wherein any copies of files in the file system view for which non-update permission is granted to other users are thereby accessible to the other users for read access.

11. The computer-implemented method according to claim 1, further comprising removing, from the file system by the file system access layer, all changes made to any files of the file system, for the particular user when executing any of the invoked applications, by removing the user-specific and application-specific file system view created for each of the any invoked application.

12. The computer-implemented method according to claim 1, further comprising removing, from the file system by the file system access layer, all changes made to any files of the file system, for the particular user, by removing all of the user-specific and application-specific file system views created for each of the any invoked application executed on behalf of the particular user.

13. The computer-implemented method according to claim 1, wherein the copy is created, by the file system access layer, from a base version of the file.

14. The computer-implemented method according to claim 1, wherein the copy is created, by the file system access layer, from a stacked copy of the file, the stacked copy corresponding to a stacked file system view, the stacked file system view being one which the corresponding file system view is logically stacked upon.

15. A system accessible on a computing system for controlling access to all files of a file system, comprising:
   a computer comprising a processor; and
   instructions which are executable, using the processor, to carry out functions comprising:
      responsive to invocation of each of a plurality of applications for execution by any particular one of a plurality of users of a file system, automatically creating, by a file system access layer that controls all access to all files of the file system, a user-specific and application-specific file system view for each of the invoked applications;
      automatically adding to the file system view, by the file system access layer, a copy of all files created by or changed by each of the invoked applications as the each application executes on behalf of the particular user, wherein for each of the invoked applications:
         all changes made by the invoked application to each added file, as the invoked application executes on behalf of the particular user, are made only to the copy added to the file system view;
         the automatically creating and the automatically adding are configured to prohibit the user from adding files to, or removing files from, the file system view for the invoked application; and
         the automatically creating and the automatically adding thereby isolate the files in the file system view created for the invoked application as the invoked application executes on behalf of the particular user from access by any of the other users and from access by any other application executed by the particular user; and
      upon completion of each of the executed applications invoked by the particular user, persisting the created file system view created therefor, such that the automatically-added copy of each of the changed or created files is available for a next execution of the completed application by the particular user through use of the persisted file system view.

16. A computer program product for controlling access to all files of a file system, the computer program product comprising computer-readable code embodied on one or more non-transitory computer-usable storage media, the computer-readable code comprising instructions that when executed on a computer cause the computer to:
   responsive to invocation of each of a plurality of applications for execution by any particular one of a plurality of users of a file system, automatically create, by a file system access layer that controls all access to all files of the file system, a user-specific and application-specific file system view for each of the invoked applications;
   automatically add to the file system view, by the file system access layer, a copy of all files created by or changed by each of the invoked applications as the each application executes on behalf of the particular user, wherein for each of the invoked applications:
      all changes made by the invoked application to each added file, as the invoked application executes on behalf of the particular user, are made only to the copy added to the file system view;
      the automatically creating and the automatically adding are configured to prohibit the user from adding files to, or removing files from, the file system view for the invoked application; and
      the automatically creating and the automatically adding thereby isolate the files in the file system view created for the invoked application as the invoked application executes on behalf of the particular user from access by any of the other users and from access by any other application executed by the particular user; and
   upon completion of each of the executed applications invoked by the particular user, persist the created file system view created therefor, such that the automatically-added copy of each of the changed or created files is available for a next execution of the completed application by the particular user through use of the persisted file system view.

17. The system according to claim 15, wherein the functions further comprise:
   removing, from the file system by the file access layer, all changes made to any files of the file system, by any application executing on behalf of the particular user, by removing the user-specific and application-specific file system view created for each of the any invoked application.

* * * * *